(12) United States Patent
Tabuchi et al.

(10) Patent No.: US 8,727,937 B2
(45) Date of Patent: May 20, 2014

(54) TOROIDAL CONTINUOUSLY VARIABLE TRANSMISSION

(75) Inventors: Motoki Tabuchi, Mishima (JP); Masami Sugaya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 672 days.

(21) Appl. No.: 12/537,693

(22) Filed: Aug. 7, 2009

(65) Prior Publication Data

US 2010/0035720 A1 Feb. 11, 2010

(30) Foreign Application Priority Data

Aug. 8, 2008 (JP) ................................. 2008-206102

(51) Int. Cl.
*F16H 15/38* (2006.01)

(52) U.S. Cl.
USPC .............................................. 476/10; 476/40

(58) Field of Classification Search
USPC ...................... 476/2, 10, 40, 42, 46
See application file for complete search history.

(56) References Cited

U.S. PATENT DOCUMENTS

| | | | |
|---|---|---|---|
| 3,087,348 A * | 4/1963 | Kraus | 476/10 |
| 6,659,906 B2 | 12/2003 | Oshidari | |
| 7,278,951 B2 * | 10/2007 | Fuller | 476/9 |

FOREIGN PATENT DOCUMENTS

| | | |
|---|---|---|
| JP | 2002-327836 | 11/2002 |
| JP | 2004-52861 | 2/2004 |
| JP | 2004-60715 | 2/2004 |
| JP | 2004-60717 | 2/2004 |
| JP | 2005-321024 A | 11/2005 |

OTHER PUBLICATIONS

Chinese Office Action issued on Jan. 19, 2011 in Application No. 200910164830.7 (with English Translation).

* cited by examiner

*Primary Examiner* — William C Joyce
(74) *Attorney, Agent, or Firm* — Oblon, Spivak, McClelland, Maier & Neustadt, L.L.P.

(57) ABSTRACT

A toroidal continuously variable transmission includes: an input disk; an output disk; a plurality of power rollers; a plurality of trunnions; an oil pump; a pressing hydraulic mechanism that moves and brings the input disk and output disk closer to each other; a shifting hydraulic mechanism that moves the trunnions forward and rearward; and a hydraulic control device that controls the pressing hydraulic mechanism and the shifting hydraulic mechanism by oil pressure. The hydraulic control device has an oil pressure regulation unit that sets an oil pressure in a shifting hydraulic line that is a hydraulic source of the shifting hydraulic mechanism to an oil pressure at which shifting control can be performed by the shifting hydraulic mechanism till the transmission of power between the input disk and output disk is interrupted when the operation of the oil pump is stopped.

12 Claims, 6 Drawing Sheets

TOROIDAL CONTINUOUSLY VARIABLE TRANSMISSION

INCORPORATION BY REFERENCE

The disclosure of Japanese Patent Application No. 2008-206102 filed on Aug. 8, 2008 including the specification, drawings and abstract is incorporated herein by reference in its entirety.

BACKGROUND OF THE INVENTION

1. Field of the Invention

The invention relates to a continuously variable transmission (CVT). In particular, the invention relates to the so-called toroidal continuously variable transmission in which a shifting ratio is changed by the movement of power rollers disposed between input disks and output disk.

2. Description of the Related Art

In a toroidal continuously variable transmission, power rollers with a curved outer peripheral surface corresponding to a toroidal surface are generally provided so that the power rollers can be inserted by a pressure of a hydraulic oil between input disks and output disks that have the toroidal surface. In the toroidal continuously variable transmission, a torque is transmitted using a shear force of an oil film of a traction oil that is formed between these input disks, output disks, and power rollers. Further, the power rollers are rotatably supported by trunnions, and the trunnions are swung in the direction along a swinging axis by a hydraulic oil pressure. In this case, the hydraulic oil is supplied by an oil pump that is driven by an engine.

Therefore, where the power rollers supported by the trunnions and the trunnions thereof move together from a neutral position to a shifting position of the input disks and output disks, a tangential force acts between the power rollers and the disks and side slip is generated. Further, the power rollers swing, that is, tilt with respect to the input disks and output disks. As a result, a shifting ratio that is a ratio of rotation speeds of the input disks and output disks is changed.

However, the oil pump that supplies the hydraulic oil is synchronously operated by the engine. Therefore, as long as the engine is driven, the hydraulic oil is supplied from the oil pump and, therefore, the shifting control that inserts the power rollers between the input disks and output disks and causes the trunnions to swing can be executed. However, immediately after the engine is stopped, the supply of hydraulic oil from the oil pump is also stopped. Therefore, the oil pressure of the hydraulic oil decreases gradually and the shifting control is not executed due to the engine stop. In other words, immediately after the engine is stopped, the hydraulic oil pressure does not drop and, therefore, power can be transmitted between the input disks and output disks via the power rollers. However, because an oil pressure sufficient for shifting control cannot be obtained due to a decrease in the hydraulic oil pressure, the trunnions cannot retain the power rollers in a neutral position and the power rollers can move to a shifting position. As a result, where a vehicle moves immediately after the engine is stopped, for example, because the vehicle is towed or travels by inertia, the shifting ratio changes. In this case, for example where the shifting ratio upshifts, a sufficient torque cannot be obtained when the vehicle starts moving and the starting performance of the vehicle can degrade.

Accordingly, a conventional toroidal continuously variable transmission is available in which an output rotation-driven pump that can supply a hydraulic oil by using the vehicle movement is provided in addition to the oil pump (engine-driven pump) (for example, Japanese Patent Application Publication No. 2004-52861 (JP-A-2004-52861)). With such a toroidal continuously variable transmission, the output rotation-driven pump is driven and the hydraulic oil is supplied where the vehicle moves in a state in which the engine is stopped. As a result, the power rollers can be inserted between the input disks and output disks and trunnions can be swung to perform shifting control.

However, in such a conventional toroidal continuously variable transmission, because the output rotation-driven pump that is not used in a normal travel mode is separately provided in addition to the oil pump, the cost is significantly increased. Further, when the engine is stopped and vehicle travels, the trunnions have to be swung and shifting control has to be performed in a state in which the power rollers are inserted between the input disks and output disks. Therefore, the shifting control is performed by electronic control, thereby consuming battery power.

SUMMARY OF THE INVENTION

Accordingly it is an object of the invention to provide a toroidal continuously variable transmission that can maintain a shifting ratio even when a vehicle travels in a state in which a hydraulic oil pressure has decreased, for example, due to a drive stop of an oil pump.

One aspect of the invention relates to a toroidal continuously variable transmission including: an input disk that inputs drive power; an output disk that is provided coaxially with the input disk and outputs the drive power; a plurality of power rollers that are provided between the input disk and the output disk; a plurality of trunnions that can rotatably support the power rollers; an oil pump that operates synchronously with engine operation; a pressing hydraulic mechanism that moves and brings the input disk and output disk closer to each other in order to perform power transmission from the input disk to the output disk via the power rollers; a shifting hydraulic mechanism that moves the trunnions forward and rearward in order to move the power rollers between a neutral position and a shifting position; and a hydraulic control device that controls the pressing hydraulic mechanism and the shifting hydraulic mechanism by a pressure of a hydraulic oil supplied from the oil pump, wherein the hydraulic control device has an oil pressure regulation unit that sets an oil pressure in a shifting hydraulic line that is a hydraulic source of the shifting hydraulic mechanism to an oil pressure at which shifting control can be performed by the shifting hydraulic mechanism till the transmission of power between the input disk and output disk is interrupted when the operation of the oil pump is stopped.

The oil pressure regulation unit may set an oil pressure in a shifting hydraulic line that is a hydraulic source of the shifting hydraulic mechanism to an oil pressure at which shifting control can be performed by the shifting hydraulic mechanism till an oil pressure in a pressing hydraulic line that is a hydraulic source of the pressing hydraulic mechanism becomes an oil pressure that interrupts the transmission of power between the input disk and output disk.

The oil pressure regulation unit has a hydraulic oil supply unit that can supply the hydraulic oil to the shifting hydraulic line that is closed.

The oil pressure regulation unit may have a closing unit that can close the shifting hydraulic line.

The pressing hydraulic line is connected by an inflow port thereof to the oil pump, the shifting hydraulic line is connected by an inflow port thereof to either the oil pump or the pressing hydraulic line, and the closing unit may have an inflow closing unit that closes the inflow port of the shifting hydraulic line.

The inflow closing unit may be a check valve that allows the hydraulic oil to flow into the shifting hydraulic line and restricts the outflow of the hydraulic oil from the shifting hydraulic line.

The oil pressure regulation unit may further have a hydraulic oil supply unit that can supply the hydraulic oil to the shifting hydraulic line that is closed.

The hydraulic oil supply unit may be provided with a pressure accumulator that is connected to the shifting hydraulic line and a hydraulic opening-closing valve that is interposed between the shifting hydraulic line and the pressure accumulator.

The hydraulic opening-closing valve may be open when the oil pump operation is stopped.

The hydraulic control device may perform shifting control by the shifting hydraulic mechanism after the shifting hydraulic line is closed.

In this case, a configuration is preferred that further includes an input shaft rotation detection unit that detects a rotation state of an input shaft on an input disk side; and an output shaft rotation detection unit that detects a rotation state of an output shaft on an output disk side, wherein the hydraulic control device stops the shifting control when at least either the input shaft or the output shaft does not rotate.

The oil pressure regulation unit preferably has an opening unit that can open the pressing hydraulic line.

In this case, it is preferred that the pressing hydraulic line be connected by an inflow port thereof to an oil pump, and the opening unit be an outflow port opening-closing valve that can open and close an outflow port of the pressing hydraulic line.

In this case, the outflow port opening-closing valve is preferably open when the oil pump operation is stopped.

Further, in this case, the outflow port opening-closing valve is preferably closed when idling stop of the engine is performed.

In the toroidal continuous variable transmission according to the one aspect of the invention, the oil pressure in the shifting hydraulic line can be set to an oil pressure that can retain the power rollers in the neutral position till the oil pressure of the pressing hydraulic line becomes an oil pressure at which the transmission of power from the input disk to the output disk is interrupted. Therefore, even though the power can be transmitted from the input disk to the output disk, the power rollers cannot move to the shifting position and, therefore, the shifting ratio of the power rollers is not changed. Further, after the transmission of power from the input disk to the output disk has been interrupted, the power rollers do not come into rotational contact with the input disk and output disk, and therefore, the shifting ratio is not changed. The resultant effect is that the shifting ratio can be maintained even if the drive wheels of the vehicle rotate after the engine has been stopped.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A toroidal continuously variable transmission according to the embodiments of the invention will be explained below with reference to the appended drawings. The invention is not limited to the embodiments. Constituent elements in the below-described embodiments include those that can be easily replaced by a person skilled in the art or those that are substantially identical.

Figure 1:
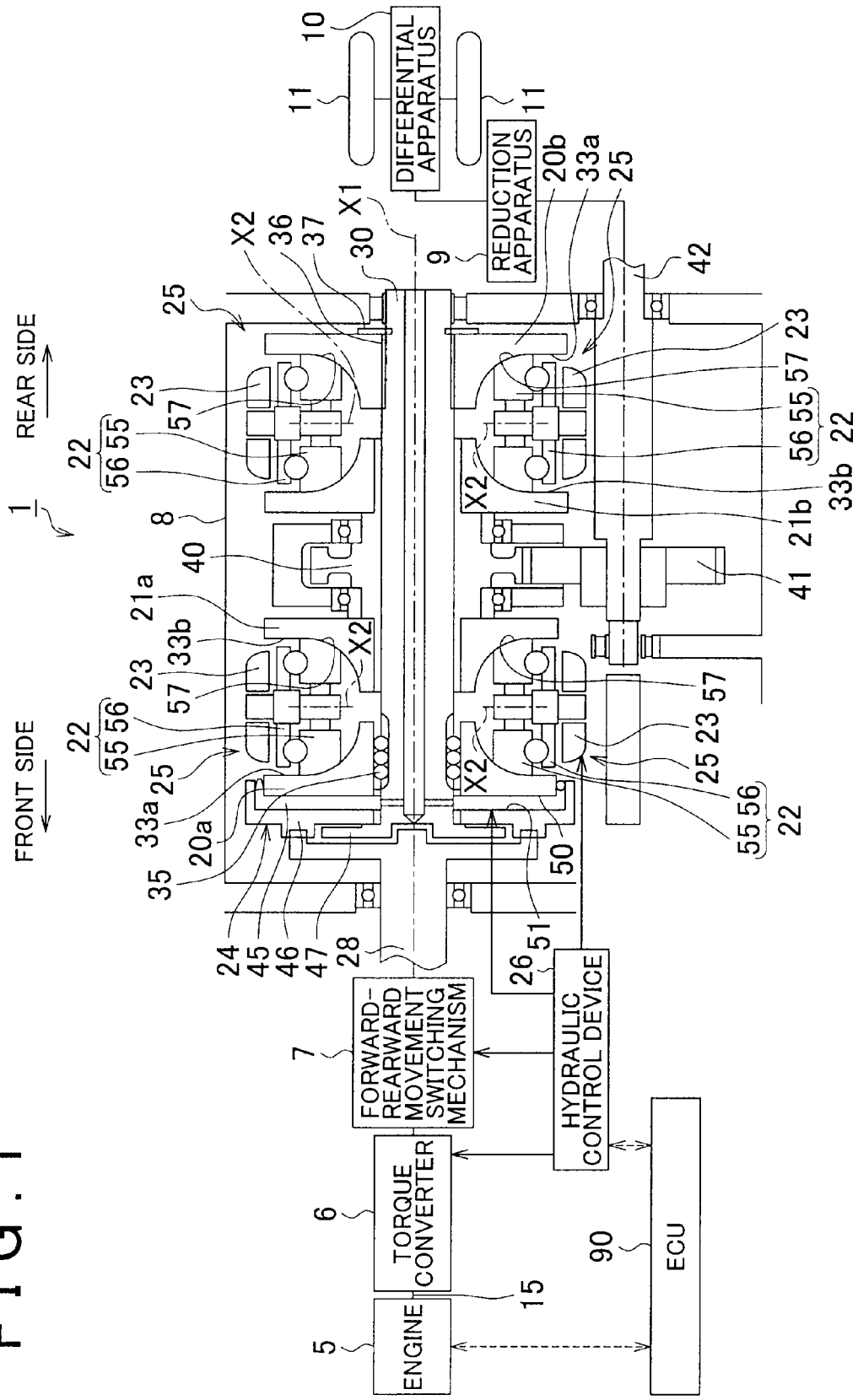
FIG. 1 is a schematic cross-sectional view of a toroidal continuously variable transmission according to Embodiment 1.
Figure 2:
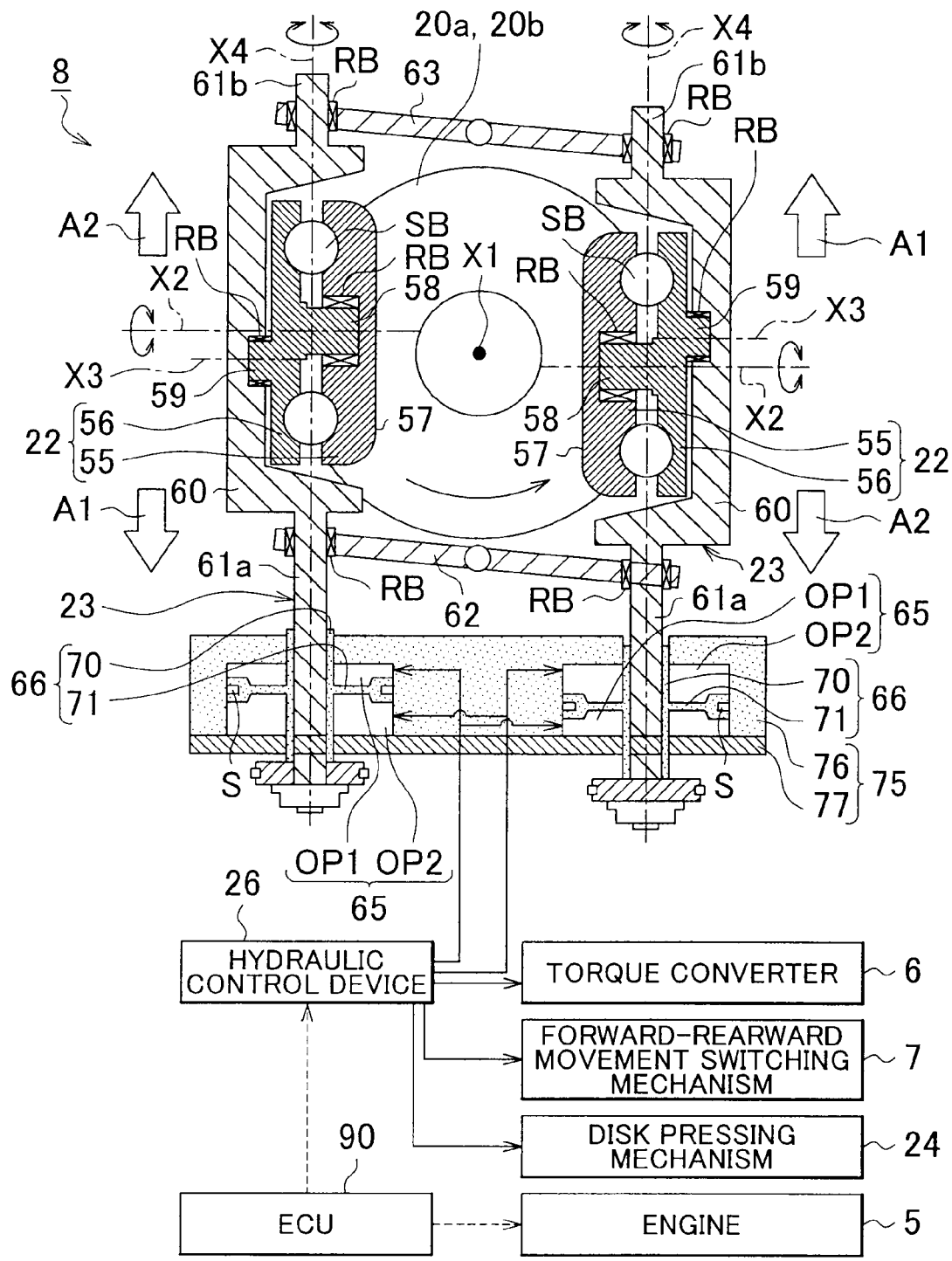
FIG. 2 is a schematic cross-sectional view of a pair of power rollers of the CVT according to Embodiment 1.
Figure 3:
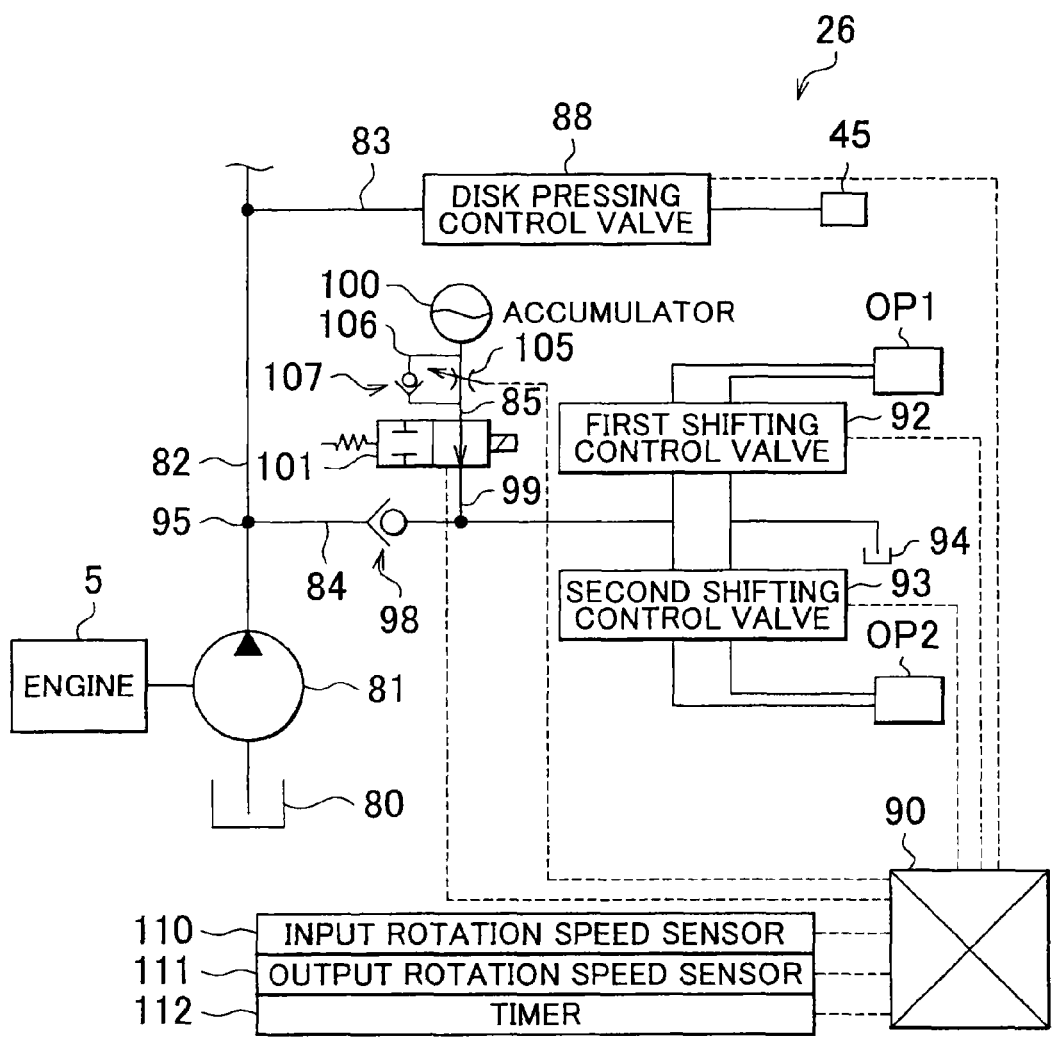
FIG. 3 is a schematic configuration diagram illustrating schematically a hydraulic circuit relating to a hydraulic control device.
Figure 4:
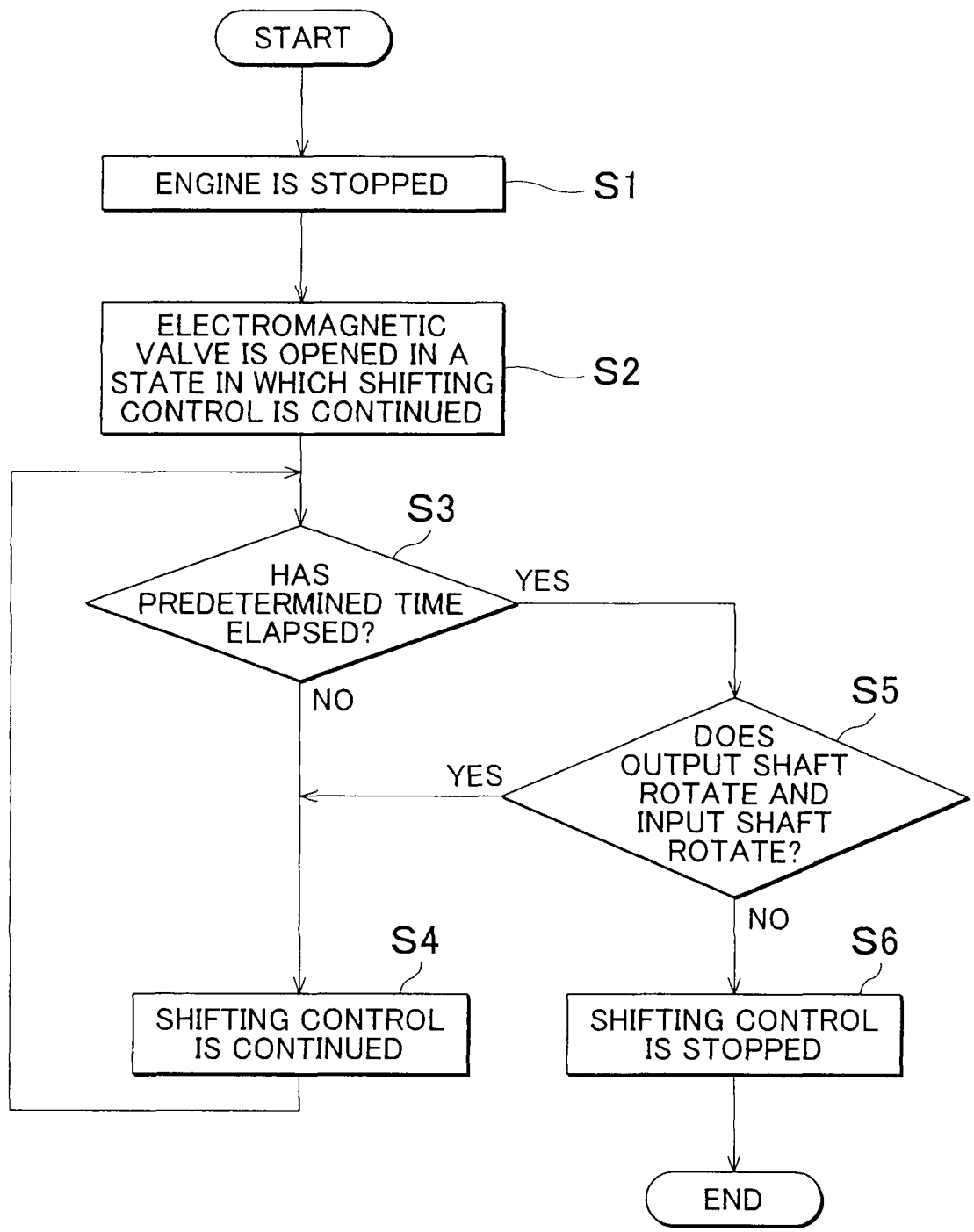
FIG. 4 is series of flowcharts relating to shifting control after the engine has been stopped.
Figure 5:
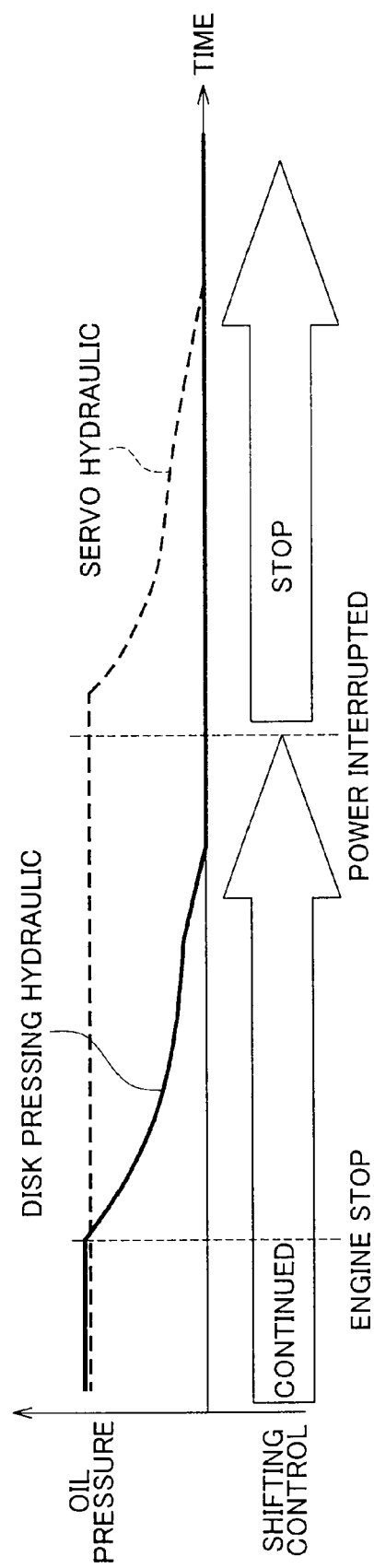
FIG. 5 is an explanatory drawing illustrating a time sequence relating to shifting control before and after the engine has been stopped.

FIG. 1 is a schematic cross-sectional view of a toroidal continuously variable transmission according to Embodiment 1. FIG. 2 is a schematic cross-sectional view of a pair of power rollers of the CVT according to Embodiment 1. FIG. 3 is a schematic configuration diagram illustrating schematically a hydraulic circuit relating to a hydraulic control device. FIG. 4 is series of flowcharts relating to shifting control after the engine has been stopped. FIG. 5 is an explanatory drawing illustrating a time sequence relating to shifting control before and after the engine has been stopped.

As shown in FIG. 1, a vehicle 1 is provided with an engine 5 serving as a drive source, a torque converter 6 that is coupled to the engine 5, a forward-rearward movement switching mechanism 7 that is coupled to the torque converter 6, and a toroidal continuously variable transmission 8 that is coupled to the forward-rearward movement switching mechanism 7. The toroidal continuously variable transmission 8 is coupled to a reduction apparatus 9. A differential apparatus 10 is coupled to the reduction apparatus 9, and drive wheels 11 are coupled to the differential apparatus 10.

The engine 5 is, for example, a gasoline engine or a diesel engine. In the engine, pistons move reciprocatingly in the central axis direction of cylinders formed to have a cylindrical shape, and drive power is outputted from a crankshaft 15 that converts the reciprocating movement of the pistons into rotational movement. This configuration is not limiting, and an electric motor may be used, or a combination of an electric motor and an engine may be used.

The torque converter 6 is a fluid clutch that transmits the drive power outputted from the engine 5 to the forward-rearward movement switching mechanism 7 via a hydraulic oil. For example, the torque converter 6 has a lockup mechanism and increases the output torque from the engine 5 for transmission, or transmits the output torque as is to the forward-rearward movement switching mechanism 7.

The toroidal continuously variable transmission 8 changes a rotation speed of the drive power inputted from the forward-rearward movement switching mechanism 7 into a desired rotation speed in response to the drive state of the vehicle and outputs the changed rotation speed. The toroidal continuously variable transmission 8 will be described below in greater detail.

The reduction apparatus 9 reduces the rotation speed of the drive power inputted from the toroidal continuously variable transmission 8 and transmits the drive power to the differential apparatus 10. The differential apparatus 10 absorbs the difference in speed between the drive wheel 11 on the inner side and the drive wheel 11 on the outer side, with respect to the turning center, that occurs when the vehicle 1 turns.

Therefore, when the engine 5 operates in the vehicle 1, the drive power outputted from the engine 5 is transmitted to the torque converter 6 via a crankshaft 15. Further, the drive power with an output torque that has been increased by the torque converter 6 is transmitted to the forward-rearward movement switching mechanism 7 and changed to the desired rotation direction by the forward-rearward movement switching mechanism 7. The drive power that now has the desired rotation direction is inputted in the toroidal continuously variable transmission 8. In the inputted drive power, the rotation speed is changed correspondingly to the predetermined shifting ratio of the toroidal continuously variable transmission 8. The drive power that has a changed rotation speed is inputted by the toroidal continuously variable transmission 8 into the reduction apparatus 9. The inputted drive power is subjected to reduction by the reduction apparatus 9 and inputted into the differential apparatus 10. The differential apparatus 10 transmits the inputted drive power to the drive wheels 11, the drive wheels 11 rotate, and the vehicle 1 is thereby caused to travel.

The toroidal continuously variable transmission 8 will be described below. The toroidal continuously variable transmission 8 is the so-called CVT that converts the drive power (output revolution speed or output torque) from the engine 5 provided on the vehicle into adequate drive power correspondingly to the travel state of the vehicle 1 and transmits the drive power to the drive wheels 11. This transmission can perform stepless (continuous) control of the shifting ratio.

As shown in FIGS. 1 and 2, the toroidal continuously variable transmission 8 is provided with a pair of input disks 20a, 20b to which the drive power is inputted via an input shaft 28, a pair of output disks 21a, 21b that are provided between the pair of input disks 20a, 20b and provided so as to face the input disks 20a, 20b, and two sets of pairs of power rollers 22 that are provided between respective input disks 20a, 20b and output disks 21a, 21b. Each power roller 22 is rotatably supported on a respective trunnion 23. The toroidal continuously variable transmission 8 is also provided with a disk pressing mechanism 24 (pressing hydraulic mechanism) that brings the input disks 20a, 20b close to the output disks 21a, 21b and sandwiches the power rollers 22 between the disks, and a hydraulic servo mechanism 25 (shifting hydraulic mechanism) that moves each trunnion 23 along swinging shafts 61a, 61b (see FIG. 2) and moves the power rollers 22 between a neutral position and a shifting position. The disk pressing mechanism 24 and hydraulic servo mechanism 25 are controlled by the hydraulic control device 26.

Therefore, in the toroidal continuously variable transmission 8, the power rollers 22 are inserted between the input disks 20a, 20b and output disks 21a, 21b by the disk pressing mechanism 24, and in this state the trunnions 23 are moved along the swinging shafts 61a, 61b by the hydraulic servo mechanism 25. As a result, the power rollers 22 move from the neutral position to the shifting position and the power rollers 22 tilt, thereby changing the shifting ratio that is the rotation speed ratio of the input disks 20a, 20b and output disks 21a, 21b.

The pair of input disks 20a, 20b are supported on a variator shaft 30 that is coupled to the input shaft 28 of the toroidal continuously variable transmission 8 and rotate integrally with the variator shaft 30 about an axial line X1. The pair of input disks 20a, 20b are provided with a front input disk 20a on the front side (side of engine 5) with respect to the variator shaft 30 and a rear input disk 20b on the rear side (side of the drive wheel 11) at a predetermined distance from the front input disk 20a.

The input disks 20a, 20b are formed to have a disk-like shape that protrudes radially outwardly from the variator shaft 30, and an opening for inserting the variator shaft 30 thereinto is formed in the axial center of the input disks. Toroidal surfaces 33a that are in contact with respective power rollers 22 are formed at the surfaces of the input disks 20a, 20b that face the output disks 21a, 21b.

The front input disk 20a is supported on the variator shaft 30 via a ball spline 35. As a result, the displacement of the front input disk 20a in the circumferential direction with respect to the variator shaft 30 can be restricted, but the displacement of the front input disk in the axial direction with respect to the variator shaft 30 is allowed. The rear input disk 20b is supported on the variator shaft 30 via a spline 36, and the movement of the rear input disk in the axial direction is restricted by a snap ring 37 provided at a rear end portion of the variator shaft 30. As a result, the displacement of the rear input disk 20b in the circumferential direction with respect to the variator shaft 30 is restricted, the displacement axially rearward with respect to the variator shaft 30 is restricted, and the displacement axially frontward is allowed. Further, the front input disk 20a is pressed by the disk pressing mechanism 24 axially rearward with respect to the variator shaft 30, and the rear input disk 20b is pressed by the disk pressing mechanism 24 axially frontward with respect to the variator shaft 30. This configuration will be described below in greater detail.

The pair of output disks 21a, 21b are rotatably supported with respect to the variator shaft 30 and rotate about an axial line X1. The pair of output disks 21a, 21b are provided between the pair of input disks 20a, 20b. The front output disk 21a is provided at the front side with respect to the variator shaft 30, and the rear output disk 21b is provided at a predetermined distance from the front output disk 21a.

Similarly to the input disks 20a, 20b, the output disks 21a, 21b are formed to have a disk-like shape that protrudes radially outward from the variator shaft 30, and an opening for freely inserting the variator shaft 30 therethrough is formed in the axial center of the output disks. Toroidal surfaces 33b that are in contact with respective power rollers 22 are formed at the surfaces of the output disks 21a, 21b that face the input disks 20a, 20b.

The front output disk 21a and rear output disk 21b are supported on the variator shaft 30 via bearings, and an output gear 40 is coupled between the pair of output disks 21a, 21b. The output gear 40 rotates integrally with the pair of output disks 21a, 21b. Further, a counter gear 41 is meshed with the output gear 40, and an output shaft 42 is coupled to the counter gear 41. Therefore, the rotation of the output disks 21a, 21b rotates the output gear 40, and the rotation is transmitted from the output gear 40 to the counter gear 41, thereby rotating the output shaft 42. The output shaft 42 is connected to the drive wheels 11 via the reduction apparatus 9 and differential apparatus 10.

Here, the disk pressing mechanism 24 that brings the input disks 20a, 20b close to the output disks 21a, 21b is provided around the input shaft 28. In other words, the disk pressing mechanism 24 inserts the pair of power rollers 22 between the input disks 20a, 20b and output disks 21a, 21b and generates a nipping pressure. The disk pressing mechanism 24 has a nipping pressure generation hydraulic chamber 45 and a nipping and pressing force piston 46.

The nipping pressure generation hydraulic chamber 45 is provided at the front input disk 20a side and disposed between the input shaft 28 and the front input disk 20a. The hydraulic oil is supplied from a disk pressing hydraulic system 83 of the hydraulic control device 26 to the nipping pressure generation hydraulic chamber 45 (see FIG. 3), which will be described later.

The nipping and pressing force piston 46 is formed in a disk-like shape and provided at one end on the front side of the variator shaft 30 so that the center of the nipping and pressing force piston substantially coincides with the axial line X1. More specifically, a flange portion 47 is formed at a front end of the variator shaft 30. The central portion of the front end surface of the nipping and pressing force piston 46 is abutted against the flange portion 47. The input shaft 28 is coupled to the outer peripheral portion of the front end surface of the nipping and pressing force piston 46. In other words, the flange portion 47 of the variator shaft 30 is disposed between the input shaft 28 and the nipping and pressing force piston 46. The nipping and pressing force piston 46 is disposed so that a predetermined distance in the X1 axis direction is created between the flange portion 47 of the variator shaft 30 and the front input disk 20a. As a result, the aforementioned nipping pressure generation hydraulic chamber 45 is formed between the nipping and pressing force piston 46 and the front input disk 20a.

Further, the nipping and pressing force piston 46 is provided so that it can rotate together with the variator shaft 30 about the axial line X1 and also move in the direction along the axial shaft X1. As a result, the rear input disk 20b, variator shaft 30, and nipping and pressing force piston 46 are configured so that they can rotate about the axial line X1 integrally with the input shaft 28 and can move in the direction along the axial line X1. Further, the front input disk 20a can rotate about the axial line X1 integrally with the rear input disk 20b, variator shaft 30, and nipping and pressing force piston 46. Moreover, the front input disk 20a can be moved by the ball spline 35 in the direction along the axial line X1 relative to the rear input disk 20b, variator shaft 30, and nipping and pressing force piston 46.

The front end surface of the front input disk 20a serves as a first operation surface 50 of hydraulic pressure for moving the front input disk 20a. The rear end surface of the nipping and pressing force piston 46 serves as a second operation surface 51 of hydraulic pressure for moving the rear input disk 20b. In other words, part of the nipping pressure generation hydraulic chamber 45 is compartmentalized by the first operation surface 50 and second operation surface 51.

Therefore, with the disk pressing mechanism 24, the hydraulic pressure of the hydraulic oil supplied into the nipping pressure generation hydraulic chamber 45 causes the front input disk 20a to move axially rearward along the axial line X1 and causes the nipping and pressing force piston 46 to move axially frontward along the axial line X1. As a result, the pair of power rollers 22 disposed between the front input disk 20a and front output disk 21a are sandwiched by the front input disk 20a and front output disk 21a. Because the rear input disk 20b is moved frontward by the axial frontward movement of the nipping and pressing force piston 46 in the direction along the axial line X1, the pair of power rollers 22 disposed between the rear input disk 20b and rear output disk 21b are sandwiched by the rear input disk 20b and rear output disk 21b. As a result, the toroidal continuously variable transmission 8 can transmit power between the input disks 20a, 20b and output disks 21a, 21b via the power rollers 22.

The two pairs of power rollers 22 are provided between the input disks 20a, 20b and output disks 21a, 21b. More specifically, one pair of power rollers 22 is provided between the front input disk 20a and front output disk 21a, and the other pair of power rollers 22 is provided between the rear input disk 20b and rear output disk 21b. Further, the power rollers 22 rotate in a state in which they are sandwiched between the input disks 20a, 20b and output disks 21a, 21b by the disk pressing mechanism 24, whereby drive power is transmitted from the input disks 20a, 20b to the output disks 21a, 21b, or driven power is transmitted from the output disks 21a, 21b to the input disks 20a, 20b. In this case, the power rollers 22 transmit the drive power or driven power by using a shear force of an oil film formed between the power rollers 22 and the input disks 20a, 20b and between the power rollers 22 and the output disks 21a, 21b by traction oil supplied to the toroidal continuously variable transmission 8.

More specifically, each power roller 22 is constituted by a power roller body 55 and an outer ring 56. The outer peripheral surface of the power roller body 55 is formed as a curved contact surface 57 corresponding to the toroidal surfaces 33a, 33b of the input disks 20a, 20b and output disks 21a, 21b. The power roller body 55 is rotatably supported via a radial bearing RB with respect to a rotation shaft 58 formed at the outer ring 56. Further, the power roller body 55 is also rotatably supported via a thrust bearing SB with respect to the surface of the outer ring 56 that faces the power roller body 55. Therefore, the power roller body 55 can rotate about an axial line X2 of the rotation shaft 58 of the outer ring 56 as a rotation center.

An eccentric shaft 59 is formed together with the above-mentioned rotation shaft 58 at the outer ring 56. The eccentric shaft 59 is formed so that an axial line X3 thereof is shifted with respect to the axial line X2 of the rotation shaft 58. The eccentric shaft 59 is rotatably supported via a radial bearing RB with respect to the below-described trunnion 23. Therefore, the outer ring 56 can rotate about the axial line X3 of the eccentric shaft 59. In other words, the power roller 22 can revolve about the axial line X3 and can rotate about the axial line X2.

The trunnions 23 that rotatably support the power rollers 22 cause the power rollers 22 to move between a neutral position and a shifting position with respect to the input disks 20a, 20b and output disks 21a, 21b. Each trunnion 23 is constituted by a body portion 60 and swinging shafts 61a, 61b.

A hollow portion for disposing the power roller 22 is formed in the body portion 60. Further, the swinging shafts 61a, 61b are formed integrally with the body portion 60 at both ends in the movement direction of the power roller 22. The swinging shafts 61a, 61b are formed in a columnar shape and rotatably support the body portion 60 so that the body portion can rotate about an axial line X4. One swinging shaft 61a that extends downward (as shown in the figure) is supported via a lower link 62 at a casing (not shown in the figure), and the other swinging shaft 61b that extends upward (as shown in the figure) is supported via an upper link 63 at a casing (not shown in the figure). Further, the swinging shaft 61a is supported by a radial bearing RB to be rotatable and axially movable with respect to the lower link 62, and the swinging shaft 61b is supported by a radial bearing RB to be rotatably and axially movable with respect to the upper link 63. Therefore, in the trunnion 23, the body portion 60 is supported to be rotatable together with the swinging shafts 61a, 61b about the axial line X4 and also to be movable in the direction along the axial line X4.

The hydraulic servo mechanism 25 that moves the trunnions 23 in the direction of axial line X4 is provided around the swinging shafts 61a, 61b of the trunnions 23. In other words, the hydraulic servo mechanism 25 moves the power rollers 22 from the neutral position to the shifting position via the trunnions 23. The hydraulic servo mechanism 25 has a shifting control hydraulic chamber 65 and a shifting control piston 66. The shifting control piston 66 receives a pressure of hydraulic oil introduced into the shifting control hydraulic chamber 65, thereby moving the trunnions 23 in two directions (direction A1 and direction A2) along the axial line X4.

The shifting control piston 66 is constituted by a piston base 70 and a flange portion 71. The piston base 70 is formed in a cylindrical shape and inserted in and fixed to one swinging shaft 61a. The flange portion 71 is formed in a disk-like shape, protruded radially outward of the swinging shaft 61a from the piston base 70, and provided fixedly at the piston base 70.

The shifting control hydraulic chamber 65 is formed inside a cylinder body 75. The cylinder body 75 is constituted by a body section 76 and a lower cover 77 provided in the bottom portion of the body section 76. A cylindrical hollow convexity serving as the shifting control hydraulic chamber 65 is formed in the bottom portion of the body section 76. The lower cover 77 is fixed to the bottom portion of the body section 76 so as to cover the opening of the convexity of the body section 76. As a result, the shifting control hydraulic chamber 65 is compartmentalized by the body section 76 and the lower cover 77 into a cylindrical shape having the axial line X4 as a central axis.

The flange portion 71 of the shifting control piston 66 is accommodated inside the shifting control hydraulic chamber 65 and divides the shifting control hydraulic chamber 65 into a first hydraulic chamber OP1 and a second hydraulic chamber OP2. In this case, the first hydraulic chamber OP1 is formed on the side in the direction A2 along the axial line X4, and the second hydraulic chamber OP2 is formed on the side in the direction A1 along the axial line X4.

Therefore, where a hydraulic oil is supplied into the first hydraulic chamber OP1, the flange portion 71 is moved by the oil pressure in the direction A1 along the axial line X4, whereas when the hydraulic oil is supplied into the second hydraulic chamber OP2, the flange portion 71 is moved by the oil pressure in the direction A2 along the axial line X4. As a result, the hydraulic servo mechanism 25 moves the trunnions 23 in the direction along the axial line X4, thereby moving the power rollers 22 from the neutral position to the shifting position corresponding to the shifting ratio with respect to the input disks 20a, 20b and output disks 21a, 21b. As a result, the power rollers 22 can be tilted with respect to the input disks 20a, 20b and output disks 21a, 21b. The power rollers 22 are then again returned to the neutral position, thereby completing the change of shifting ratio. In this case, an annular seal member S is provided at the axial outward distal end of the flange portion 71, and the annular seal member S performs sealing such that the hydraulic oils contained inside the first hydraulic chamber OP1 and second hydraulic chamber OP2 do not leak from one chamber to the other. In the pair of trunnions 23 that support the pair of power rollers 22, the first hydraulic chamber OP1 and second hydraulic chamber OP2 that are formed around the swinging shaft 61a of one trunnion 23 have a mutual arrangement reversed with respect to that of the first hydraulic chamber OP1 and second hydraulic chamber OP2 formed around the swinging shaft 61a of the other trunnion 23.

Here, the disk pressing mechanism 24 and hydraulic servo mechanism 25 are controlled by the hydraulic control device 26. As shown in FIG. 3, the hydraulic control device 26 is provided with an oil tank 80 that stores the hydraulic oil, an oil pump 81 that is driven by the engine 5, a line pressure system 82 that supplies the hydraulic oil pumped by the oil pump 81 to various components, a disk pressing hydraulic system 83 (pressing hydraulic line) connected to the line pressure system 82, a servo hydraulic system 84 (shifting hydraulic line) connected to the line pressure system 82, and an oil pressure regulation system 85 (oil pressure regulation means) provided in the servo hydraulic system 84. In this configuration, the servo hydraulic system 84 is connected to the line pressure system 82 upstream of the disk pressing hydraulic system 83.

The oil pump 81 operates following the operation of the engine 5, for example, following the rotation of the crankshaft 15, and sucks in, pressurizes, and discharges the hydraulic oil stored in the oil tank 80. The pressurized and discharged hydraulic oil is supplied via the line pressure system 82 to the disk pressing hydraulic system 83 or servo hydraulic system 84.

The line pressure system 82 supplies the hydraulic oil discharged from the oil pump 81 to various components, for example, the forward-backward switching mechanism 7, disk pressing mechanism 24, and hydraulic servo mechanism 25. The oil pressure inside the line pressure system 82 is maintained at a predetermined level by supplying the hydraulic oil with the oil pump 81 when the engine 5 operates. However, when the operation of the engine 5 is stopped, the supply of the hydraulic oil by the oil pump 81 is stopped, and the oil pressure in the line pressure system 82 gradually decreases.

The disk pressing hydraulic system 83 serves as a drive source (hydraulic source) of the disk pressing mechanism 24 and connects the line pressure system 82 and the nipping pressure generation hydraulic chamber 45. A disk pressing control valve 88 that regulates the flow rate of the hydraulic oil supplied to the nipping pressure generation hydraulic chamber 45 is provided in the disk pressing hydraulic system 83.

The disk pressing control valve 88 is controlled by an engine electronic control unit (ECU) 90. By controlling the disk pressing control valve 88 with the ECU 90, the connection state of the line pressure system 82 and the nipping pressure generation hydraulic chamber 45 is switched. As a result, the hydraulic oil is supplied to the nipping pressure generation hydraulic chamber 45. Therefore, in a case where the hydraulic oil is supplied in the nipping pressure generation hydraulic chamber 45, the ECU 90 opens the disk pressing control valve 88 on the basis of valve control amount that serves as a predetermined nipping force. Where the oil pump 81 stops because the operation of the engine 5 is stopped, the oil pressure inside the line pressure system 82 decreases. Therefore, following this decrease, the oil pressure inside the disk pressing hydraulic system 83 also gradually decreases. As a result, the oil pressure inside the nipping pressure generation hydraulic chamber 45 decreases. Therefore, the nipping force that is applied from the input disks 20a, 20b and output disks 21a, 21b that are pressed by the disk pressing mechanism 24 to the power rollers 22 gradually decreases. Eventually, the transmission of power between the input disks 20a, 20b and output disks 21a, 21b is interrupted.

The servo hydraulic system 84 serves as a drive source (hydraulic source) of the hydraulic servo mechanism 25 and connects the line pressure system 82 to the first hydraulic chamber OP1 and second hydraulic chamber OP2. A first shifting control valve 92 that regulates the flow rate of hydraulic oil supplied from the line pressure system 82 to the first hydraulic chamber OP1 and a second shifting control valve 93 that regulates the flow rate of hydraulic oil supplied from the line pressure system 82 to the second hydraulic chamber OP2 are provided in the servo hydraulic system 84.

The first shifting control valve 92 is controlled by the ECU 90. The ECU 90 controls the first shifting control valve 92 and switches the connection state of the line pressure system 82 and first hydraulic chamber OP1. As a result, the hydraulic oil is supplied from the line pressure system.82 to the first hydraulic chamber OP1, and the hydraulic oil is discharged from the first hydraulic chamber OP1 to an oil pan 94. The second shifting control valve 93 is configured similarly to the first shifting control valve 92 and also controlled by the ECU 90. The ECU 90 controls the second shifting control valve 93 and switches the connection state of the line pressure system 82 and second hydraulic chamber OP2. As a result, the hydraulic oil is supplied from the line pressure system 82 to the second hydraulic chamber OP2, and the hydraulic oil is discharged from the second hydraulic chamber OP2 to an oil pan 94.

In a case where the flange portion 71 is moved in the direction A1 along the axial line X4, the first shifting control valve 92 is controlled by the ECU 90, the hydraulic oil is supplied from the line pressure system 82 to the first hydraulic chamber OP1, the second shifting control valve 93 is controlled by the ECU 90, and the hydraulic oil is discharged from the second hydraulic chamber OP2 to the oil pan 94. In a case where the flange portion 71 is moved in the direction A2 along the axial line X4, the first shifting control valve 92 is controlled by the ECU 90, the hydraulic oil is discharged from the first hydraulic chamber OP1 to the oil pan 94, the second shifting control valve 93 is controlled by the ECU 90, and the hydraulic oil is supplied from the line pressure system 82 to the second hydraulic chamber OP2.

Here, the oil pressure regulation system 85 (oil pressure regulation means) is provided between the connection portion 95 of the line pressure system 82 and servo hydraulic system 84, on one side, and the first shifting control valve 92 and second shifting control valve 93, on the other side. The oil pressure regulation system 85 maintains the oil pressure inside the servo hydraulic system 84 at a level such that shifting can be controlled with the hydraulic servo mechanism 25 till the oil pressure inside the disk pressing hydraulic system 83 becomes such that interrupts the transmission of power between the input disks 20a, 20b and the output disks 21a, 21b when the oil pump 81 is stopped (when oil pressure inside the disk pressing hydraulic system 83 decreases). The oil pressure regulation system 85 is provided with a check valve 98 (inflow closing means) that is provided downstream of the connection portion 95 of the line pressure system 82 and servo hydraulic system 84 in the oil flow direction, a pressure accumulator 100 that is connected via a hydraulic supply channel 99 between the check valve 98, first shifting control valve 92, and second shifting control valve 93, and an electromagnetic valve 101 (hydraulic opening-closing valve) introduced in the hydraulic supply channel 99.

The check valve 98 allows the inflow of hydraulic oil from the line pressure system 82 into the servo hydraulic system 84 and restricts the inflow of hydraulic oil from the servo hydraulic system 84 into the line pressure system 82. As a result, even when the oil pressure inside the line pressure system 82 decreases, the hydraulic oil contained inside the servo hydraulic system 84 does not flow out into the line pressure system 82. The check valve 98 functions as an inflow closing means for closing an inflow port of the servo hydraulic system 84. In this case, the first shifting control valve 92 and second shifting control valve 93 are switched so that the hydraulic oil is not discharged into the oil pan 94. In other words, the servo hydraulic system 84 is closed by the check valve 98, first shifting control valve 92, and second shifting control valve 93. Therefore, even when the oil pressure in the line pressure system 82 decreases, by closing the servo hydraulic system 84, it is possible to prevent the hydraulic oil contained in the servo hydraulic system 84 from flowing out of the servo hydraulic system 84. Therefore, the decrease in oil pressure inside the servo hydraulic system 84 can be prevented.

The pressure accumulator 100 stores the hydraulic oil that flows in via the hydraulic supply channel 99, thereby maintaining the predetermined oil pressure, and also serves to supply the stored hydraulic oil via the hydraulic supply channel 99. Thus, because the pressure accumulator 100 is connected to the servo hydraulic system 84 via the hydraulic supply channel, the hydraulic oil is stored from the servo hydraulic system 84 via the hydraulic supply channel and the hydraulic oil is also supplied to the servo hydraulic system 84 via the hydraulic supply channel 99.

The electromagnetic valve 101 opens or closes the hydraulic supply channel 99. The electromagnetic valve is controlled by the ECU 90 and used to store the hydraulic oil in the pressure accumulator 100 and supply the hydraulic oil from the pressure accumulator 100. More specifically, when the engine 5 operates, the line pressure system 82 is under a predetermined oil pressure. Further, in a case where the oil pressure to the pressure accumulator 100 is not sufficiently guaranteed, that is, the pressure accumulator is not filled with the hydraulic oil, the electromagnetic valve 101 opens the hydraulic supply channel 99, thereby filling the pressure accumulator 100 with the hydraulic oil and ensuring the predetermined oil pressure. Where the oil pressure to the pressure accumulator 100 is thereafter ensured, the electromagnetic valve 101 closes the hydraulic supply channel 99 and maintains the hydraulic pressure ensured in the pressure accumulator 100. Where the operation of the engine 5 is stopped in a state in which the oil pressure in the pressure accumulator 100 is ensured, the electromagnetic valve 101 opens the hydraulic supply channel 99, supplies the hydraulic oil into the servo hydraulic system 84, and maintains the oil pressure inside the servo hydraulic system 84.

Further, a flow rate regulating valve 105 is provided in the hydraulic supply channel 99 between the pressure accumulator 100 and electromagnetic valve 101, and a hydraulic bypass channel 106 that bypasses the flow rate regulating valve 105 is formed. A check valve 107 is provided in the hydraulic bypass channel 106. As a result, the check valve 107 allows the inflow of hydraulic oil into the pressure accumulator 100 and restricts the outflow of the hydraulic oil from the pressure accumulator 100. The flow rate regulating valve 105 regulates the flow rate of hydraulic oil in the hydraulic supply channel 99 between the pressure accumulator 100 and electromagnetic valve 101.

As shown in FIGS. 1 and 2, the ECU 90 controls the engine 5 and hydraulic control device 26. Further, as shown in FIG. 3, in the hydraulic control device 26, the ECU 90 open-close controls the above-described disk pressing control valve 88, first shifting control valve 92, second shifting control valve 93, electromagnetic valve 101, and flow rate regulating valve 105, and where these control valves are opened or closed, the shifting ratio of the toroidal continuously variable transmission 8 is changed. An input rotation speed sensor 110 (input shaft rotation detection means) that detects an input rotation speed Nin, which is the rotation speed of the input disks 20a, 20b, and an output rotation speed sensor 111 (output shaft rotation detection means) that detects an output rotation speed Nout, which is the rotation speed of the output disks 21a, 21b, are connected to the ECU 90. Further, a timer 112 that measures time is also connected to the ECU 90. Based on the detection results of the input rotation speed sensor 110 and output rotation speed sensor 111, the ECU 90 performs shifting control of the toroidal continuously variable transmission 8. In this case, the ECU 90 is configured to perform the shifting control for a predetermined time even after the operation of the engine 5 is stopped.

More specifically, a series of shifting control operations performed by the ECU 90 after the engine 5 has been stopped will be explained below with reference to FIGS. 4 and 5. While the engine 5 operates, the ECU 90 performs shifting control by controlling the pressing control valve 88, first shifting control valve 92, and second shifting control valve 93, and fills the pressure accumulator 100 with the hydraulic oil by controlling the electromagnetic valve 101. Where the operation of the engine 5 is stopped in this state (S1), the ECU 90 opens the electromagnetic valve 101, while continuing the shifting control (S2).

In this case, where the engine 5 is stopped, as shown in FIG. 5, the drive of the oil pump 81 is stopped. Therefore, the oil pressure inside the line pressure system 82 decreases, and the oil pressure inside the disk pressing hydraulic system 83 decreases accordingly. As for the oil pressure inside the servo hydraulic system 84, because the hydraulic oil is supplied from the pressure accumulator 100 into the servo hydraulic system 84 in a state in which the outflow of the hydraulic oil from the servo hydraulic system 84 into the line pressure system 82 is restricted and the discharge of the hydraulic oil from the servo hydraulic system 84 into the oil pan is restricted by the check valve 98, first shifting control valve 92, and second shifting control valve 93, a predetermined oil pressure is maintained inside the servo hydraulic system. As a result, the servo hydraulic system 84 is maintained under an oil pressure at which shifting control can be performed.

The ECU 90 then determines with the timer 112 whether a predetermined time has passed (S3). The predetermined time as referred to herein is the time in which the oil pressure falls inside the disk pressing hydraulic system 83, that is, the time required for the oil pressure to decrease to a level at which power transmission from the input disks 20a, 20b to the output disks 21a, 21b via the power rollers 22 is impossible.

Where the predetermined time is determined not be reached, the ECU 90 continuously executes the shifting control (S4). Where the predetermined time is determined to be reached, the ECU 90 determines whether the input rotation speed Nin and output rotation speed Nout are detected based on the detection results of the input rotation speed sensor 110 and output rotation speed sensor 111 (S5). Where the input rotation speed Nin and output rotation speed Nout are detected, that is, where the input disks 20a, 20b and output disks 21a, 21b rotate, the ECU 90 determines that power transmission between the input disks 20a, 20b and output disks 21a, 21b via the power rollers 22 is performed and continues the shifting control. In a case where at least either of the input rotation speed Nin and output rotation speed Nout is not detected, that is, at least any one of the input disks 20a, 20b and output disks 21a, 21b does not rotate, the ECU 90 determines that power transmission between the input disks 20a, 20b and output disks 21a, 21b via the power rollers 22 is not performed and stops the shifting control (S6). The stop of shifting control as referred to herein means that power supply from the battery to the ECU 90 and various control valves is terminated.

With the above-described configuration, even though the transmission of power between the input disks 20a, 20b and output disks 21a, 21b is possible immediately after the engine 5 has been stopped, the oil pressure inside the servo hydraulic system 84 can be maintained till an oil pressure is assumed at which the power transmission is interrupted. Therefore, even if the vehicle 1 travels in a state in which the transmission of power between the input disks 20a, 20b and output disks 21a, 21b is possible after the engine 5 has been stopped, the predetermined shifting ratio can be maintained by shifting control. Further, even if the shifting control is stopped after the transmission of power between the input disks 20a, 20b and output disks 21a, 21b has been interrupted, because the power rollers 22 are not in a rolling contact with the input disks 20a, 20b and output disks 21a, 21b, the shifting ratio is not changed. As a result, even if the drive wheels 11 of the vehicle 1 rotate after the engine 5 has been stopped, the shifting ratio can be maintained.

In Embodiment 1, the predetermined oil pressure is maintained by supplying the hydraulic oil from the pressure accumulator 100 into the servo hydraulic system 84 in a state in which the servo hydraulic system 84 is closed by the check valve 98, first shifting control valve 92, and second shifting control valve 93, but a configuration in which the supply of hydraulic oil from the pressure accumulator 100 is discarded may be also used. In this case, it is preferred that valves of various types with a high sealing ability be used so as to prevent the hydraulic oil from leaking from the check valve 98, first shifting control valve 92, and second shifting control valve 93. With such a configuration, the hydraulic oil does not leak if the servo hydraulic system 84 is in a closed state. Therefore, the predetermined oil pressure can be maintained. In other words, the pressure accumulator 100 supplies the hydraulic oil in order to compensate the leak of the hydraulic oil from the servo hydraulic system 84 in a closed state.

Figure 6:
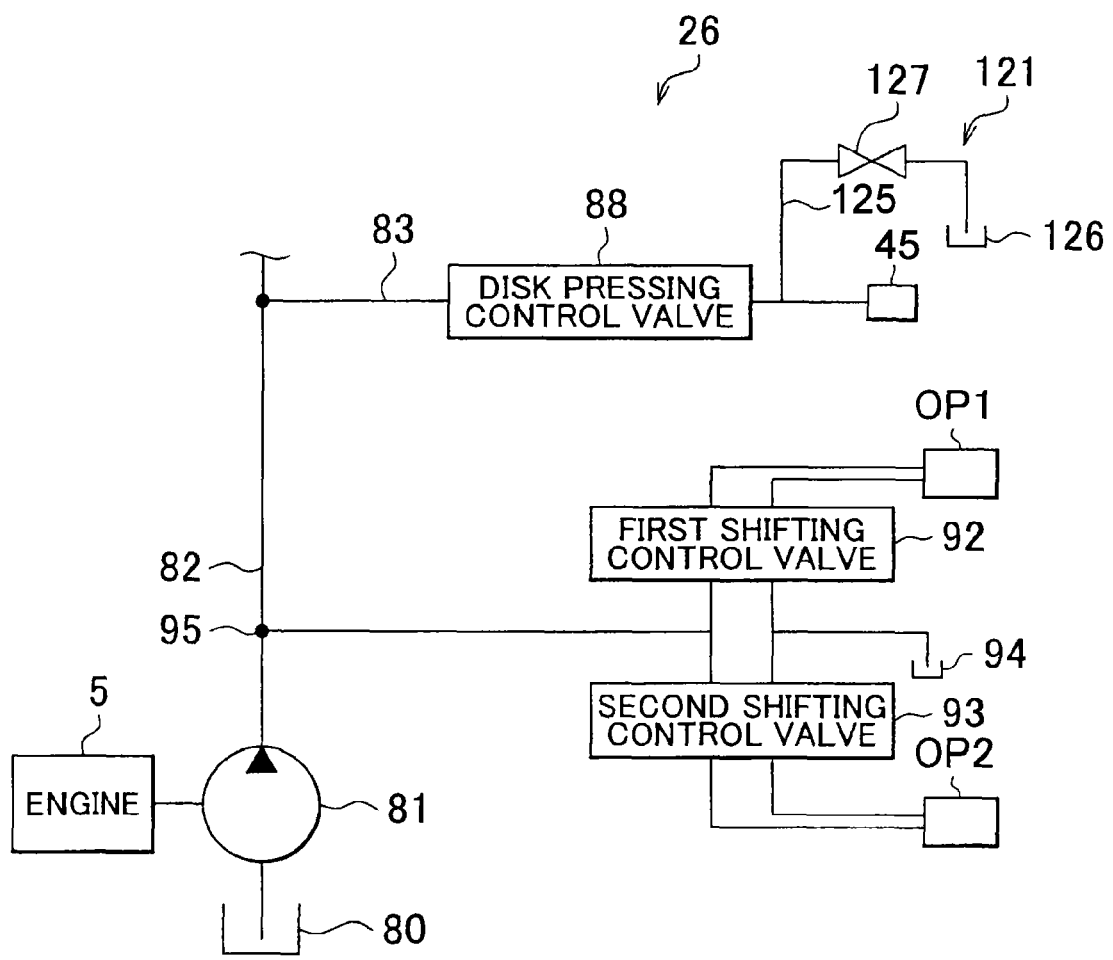
FIG. 6 is a schematic configuration diagram illustrating schematically a hydraulic circuit relating to a hydraulic control device according to Embodiment 2.

A toroidal continuously variable transmission of Embodiment 2 will be explained below with reference to FIG. 6. In order to avoid redundant description, only different components will be explained. FIG. 6 is a schematic configuration diagram illustrating schematically a hydraulic circuit relating to a hydraulic control device according to Embodiment 2. The toroidal continuously variable transmission 8 of Embodiment 1 has a configuration such that the oil pressure regulation system 85 thereof supplies the hydraulic oil to the closed servo hydraulic system 84 when the oil pump 81 is stopped, thereby maintaining the oil pressure in the servo hydraulic system 84 at a level such that the power rollers 22 can move in the direction along the axial line X4 till the oil pressure in the disk pressing hydraulic system 83 becomes an oil pressure that interrupts the transmission of power between the input disks 20a, 20b and the output disks 21a, 21b. By contrast, the toroidal continuously variable transmission of Embodiment 2 has a configuration in which an oil pressure regulation system 121 interrupts the transmission of power between the input disks 20a, 20b and the output disks 21a, 21b by opening the disk pressing hydraulic system 83 when the oil pump 81 is stopped, before the oil pressure in the servo hydraulic system 84 becomes such that the power roller 22 cannot be moved in the direction along the axial line X4.

More specifically, an oil pressure regulation system 121 is provided in the disk pressing hydraulic system 83. An oil pan 126 is provided via a hydraulic opening channel 125 downstream of the disk pressing control vale 88 in the oil flow direction. A channel opening-closing valve 127 is introduced in the hydraulic opening channel 125. The channel opening-closing valve 127 is controlled by the ECU 90, and where the channel opening-closing valve 127 is opened when the operation of the oil pump 81 is stopped, the oil pressure in the disk pressing hydraulic system 83 is decreased.

Therefore, where the operation of the engine 5 is stopped, the oil pressure inside the line pressure system 82 decreases, but where the ECU 90 opens the channel opening-closing valve 127 in this case, the oil pressure in the disk pressing hydraulic system 83 is rapidly decreased. As a result, the transmission of power between the input disks 20a, 20b and the output disks 21a, 21b can be interrupted before the oil pressure in the servo hydraulic system 84 becomes an oil pressure at which the shifting control is impossible.

When the operation of the oil pump 81 is stopped during idling of the engine 5, the ECU 90 performs control to close the channel opening-closing valve 127. As a result, in a case where the engine 5 is driven and the vehicle 1 travels, the ECU 90 can immediately raise the oil pressure of the disk pressing hydraulic system 83. Therefore, the shifting control can be immediately performed.

With the above-described configuration, even though the transmission of power between the input disks 20a, 20b and output disks 21a, 21b is possible immediately after the engine 5 has been stopped, the oil pressure inside the servo hydraulic system 84 can be maintained till an oil pressure is assumed at which the power transmission is interrupted. Therefore, even if the vehicle 1 travels in a state in which the transmission of power between the input disks 20a, 20b and output disks 21a, 21b is possible after the engine 5 has been stopped, the predetermined shifting ratio can be maintained by shifting control. Further, because the power rollers 22 are not in a rolling contact with the input disks 20a, 20b and output disks 21a, 21b after the transmission of power between the input disks 20a, 20b and output disks 21a, 21b has been interrupted, the shifting ratio is not changed. As a result, even if the drive wheels 11 of the vehicle 1 rotate after the engine 5 has been stopped, the shifting ratio can be maintained.

What is claimed is:

1. A toroidal continuously variable transmission comprising:
    an input disk that inputs drive power;
    an output disk that is provided coaxially with the input disk and outputs the drive power;
    a plurality of power rollers that are provided between the input disk and the output disk;
    a plurality of trunnions that rotatably supports the power rollers;
    an oil pump that operates synchronously with engine operation;
    a pressing hydraulic mechanism that moves and brings the input disk and output disk closer to each other in order to perform power transmission from the input disk to the output disk via the power rollers;
    a shifting hydraulic mechanism that moves the trunnions forward and rearward in order to move the power rollers between a neutral position and a shifting position; and
    a hydraulic control device that controls the pressing hydraulic mechanism and the shifting hydraulic mechanism by a pressure of a hydraulic oil supplied from the oil pump, wherein
    the hydraulic control device has an oil pressure regulation unit that sets an oil pressure in a shifting hydraulic line that is a hydraulic source of the shifting hydraulic mechanism to an oil pressure at which shifting control can be performed by the shifting hydraulic mechanism until the transmission of power between the input disk and output disk is interrupted when the operation of the oil pump is stopped,
    the oil pressure regulation unit includes an opening unit that opens a pressing hydraulic line that is a hydraulic source of the pressing hydraulic mechanism,
    the pressing hydraulic line is connected by an inflow port of the pressing hydraulic line to the oil pump, and the opening unit is an outflow port opening-closing valve that opens and closes an outflow port of the pressing hydraulic line,
    the outflow port opening-closing valve is open when the oil pump operation is stopped, and
    when the operation of the oil pump is stopped the oil pressure regulation unit sets the oil pressure in the shifting hydraulic line that is the hydraulic source of the shifting hydraulic mechanism to the oil pressure at which shifting control can be performed by the shifting hydraulic mechanism until an oil pressure in the pressing hydraulic line that is the hydraulic source of the pressing hydraulic mechanism is lowered by the outflow port opening-closing valve to become an oil pressure that interrupts the transmission of power between the input disk and output disk.

2. The toroidal continuously variable transmission according to claim 1, wherein the oil pressure regulation unit has a hydraulic oil supply unit that supplies the hydraulic oil to the shifting hydraulic line that is closed.

3. The toroidal continuously variable transmission according to claim 1, wherein the oil pressure regulation unit has a closing unit that closes the shifting hydraulic line.

4. The toroidal continuously variable transmission according to claim 3, wherein the pressing hydraulic line is connected by an inflow port of the pressing hydraulic line to the oil pump, the shifting hydraulic line is connected by an inflow port of the shifting hydraulic line to either the oil pump or the pressing hydraulic line, and the closing unit has an inflow closing unit that closes the inflow port of the shifting hydraulic line.

5. The toroidal continuously variable transmission according to claim 4, wherein the inflow closing unit is a check valve that allows the hydraulic oil to flow into the shifting hydraulic line and restricts the outflow of the hydraulic oil from the shifting hydraulic line.

6. The toroidal continuously variable transmission according to claim 3, wherein the oil pressure regulation unit further has a hydraulic oil supply unit that supplies the hydraulic oil to the shifting hydraulic line that is closed.

7. The toroidal continuously variable transmission according to claim 6, wherein the hydraulic oil supply unit is provided with a pressure accumulator that is connected to the shifting hydraulic line and a hydraulic opening-closing valve that is interposed between the shifting hydraulic line and the pressure accumulator.

8. The toroidal continuously variable transmission according to claim 7, wherein the hydraulic opening-closing valve is open when the oil pump operation is stopped.

9. The toroidal continuously variable transmission according to claim 3, wherein the hydraulic control device performs shifting control by the shifting hydraulic mechanism after the shifting hydraulic line is closed.

10. The toroidal continuously variable transmission according to claim 9, further comprising:
    an input shaft rotation detection unit that detects a rotation state of an input shaft on an input disk side; and
    an output shaft rotation detection unit that detects a rotation state of an output shaft on an output disk side, wherein
    the hydraulic control device stops the shifting control when at least either the input shaft or the output shaft does not rotate.

11. The toroidal continuously variable transmission according to claim 1, wherein the pressing hydraulic line includes a disk pressing control valve that regulates an oil flow rate to a pressure chamber that moves and brings the input disk and output disk closer to each other, and the opening unit is downstream of the disk pressing control valve.

12. The toroidal continuously variable transmission according to claim 1, wherein the outflow port opening-closing valve is closed after the oil pressure in the pressing hydraulic line becomes the oil pressure that interrupts the transmission of power between the input disk and output disk.

\* \* \* \* \*